(12) United States Patent
Yagawa et al.

(10) Patent No.: US 7,164,707 B2
(45) Date of Patent: Jan. 16, 2007

(54) CELLULAR RADIO COMMUNICATION SYSTEM CELLULAR RADIO COMMUNICATION METHOD AND RAKE RECEPTION METHOD

(75) Inventors: Kenichiro Yagawa, Tokyo (JP); Ken Kasagi, Tokyo (JP); Tomoyuki Teramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/008,212

(22) Filed: Dec. 10, 2004

(65) Prior Publication Data

US 2005/0129102 A1    Jun. 16, 2005

(30) Foreign Application Priority Data

Dec. 11, 2003    (JP)    ............................. 2003-413270

(51) Int. Cl.
  *H04B 1/38*    (2006.01)
(52) U.S. Cl. ........................ 375/219; 375/222; 455/73; 455/83
(58) Field of Classification Search ................ 375/219, 375/220, 222, 295, 22; 455/73, 78, 82, 83
See application file for complete search history.

(56) References Cited

U.S. PATENT DOCUMENTS 5,887,021 A    3/1999  Keskitalo et al.
6,577,880 B1    6/2003  Ishida et al.
6,768,770 B1*    7/2004  Lipperer et al. ............ 375/219
7,031,755 B1    4/2006  Li et al.
2001/0033600 A1    10/2001  Yang et al.
2002/0193147 A1*    12/2002  Li et al. ...................... 455/562
2003/0086485 A1*    5/2003  Lin et al. ..................... 375/219

FOREIGN PATENT DOCUMENTS

CN    1310557 A    8/2001
JP    2858514    12/1998

* cited by examiner

Primary Examiner—Temesghen Ghebretinsae
(74) Attorney, Agent, or Firm—Foley & Lardner LLP

(57) ABSTRACT

A cellular radio communication system, a cellular radio communication method and a rake reception method for raising the efficiency of a baseband, and increasing the freedom of the structure of the radio base station. A cellular radio communication system comprises a baseband and first to Nth transmitter-receeicvers connected by a transmission line. The baseband is provided with a modulator for producing, by a digital process, modulation signals to be sent from the first to Nth transmitter-receivers, and a demodulator for demodulating digital modulation signals received and analog-to-digital converted by the first to Nth transmitter-receivers. The transmitter-receiver is provided with a digital-to-analog converter for converting a digital modulation signal to a modulation signal to be sent, and an analog-to-digital converter for converting a received modulation signal to a digital modulation signal.

6 Claims, 7 Drawing Sheets

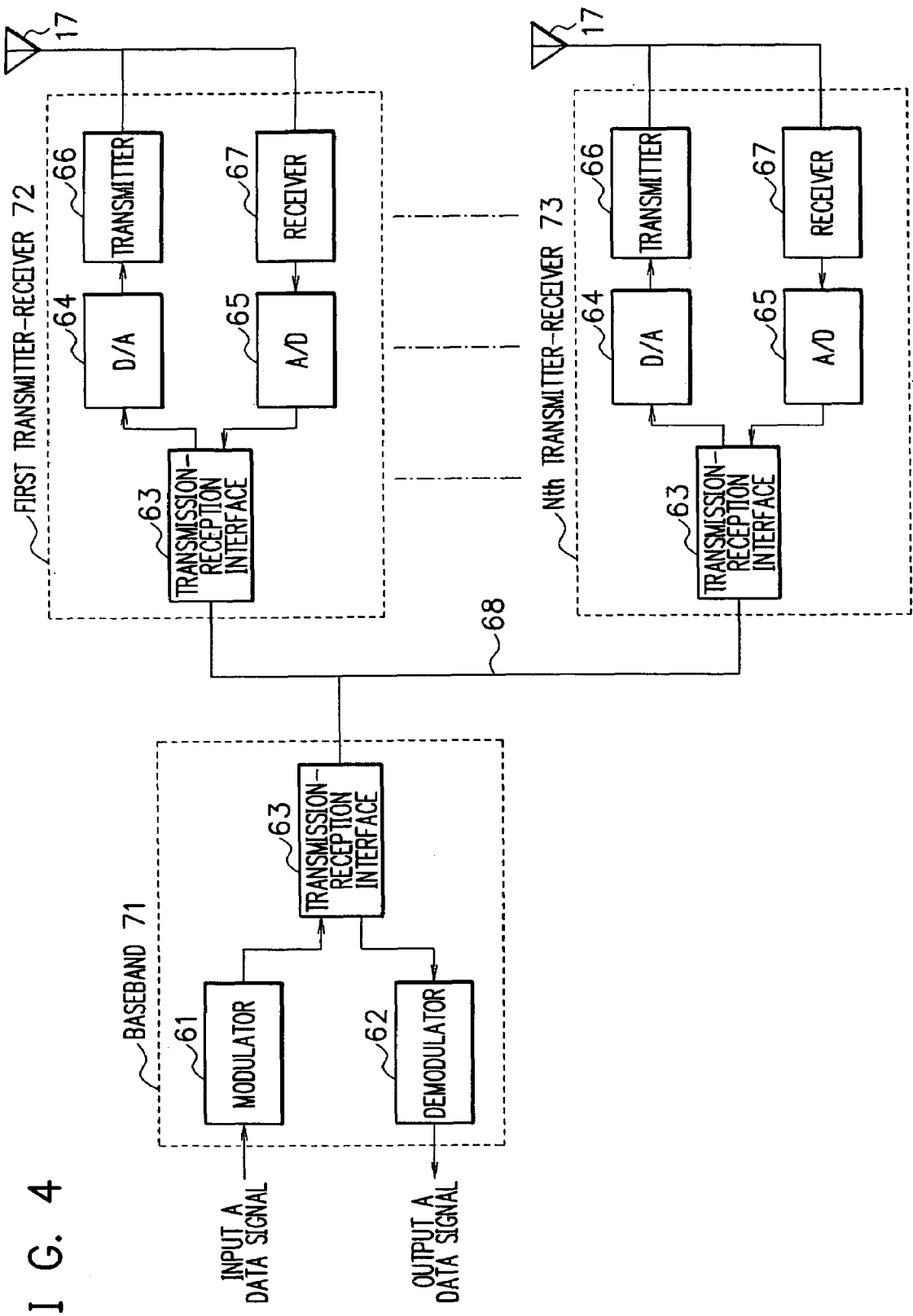
F I G. 4

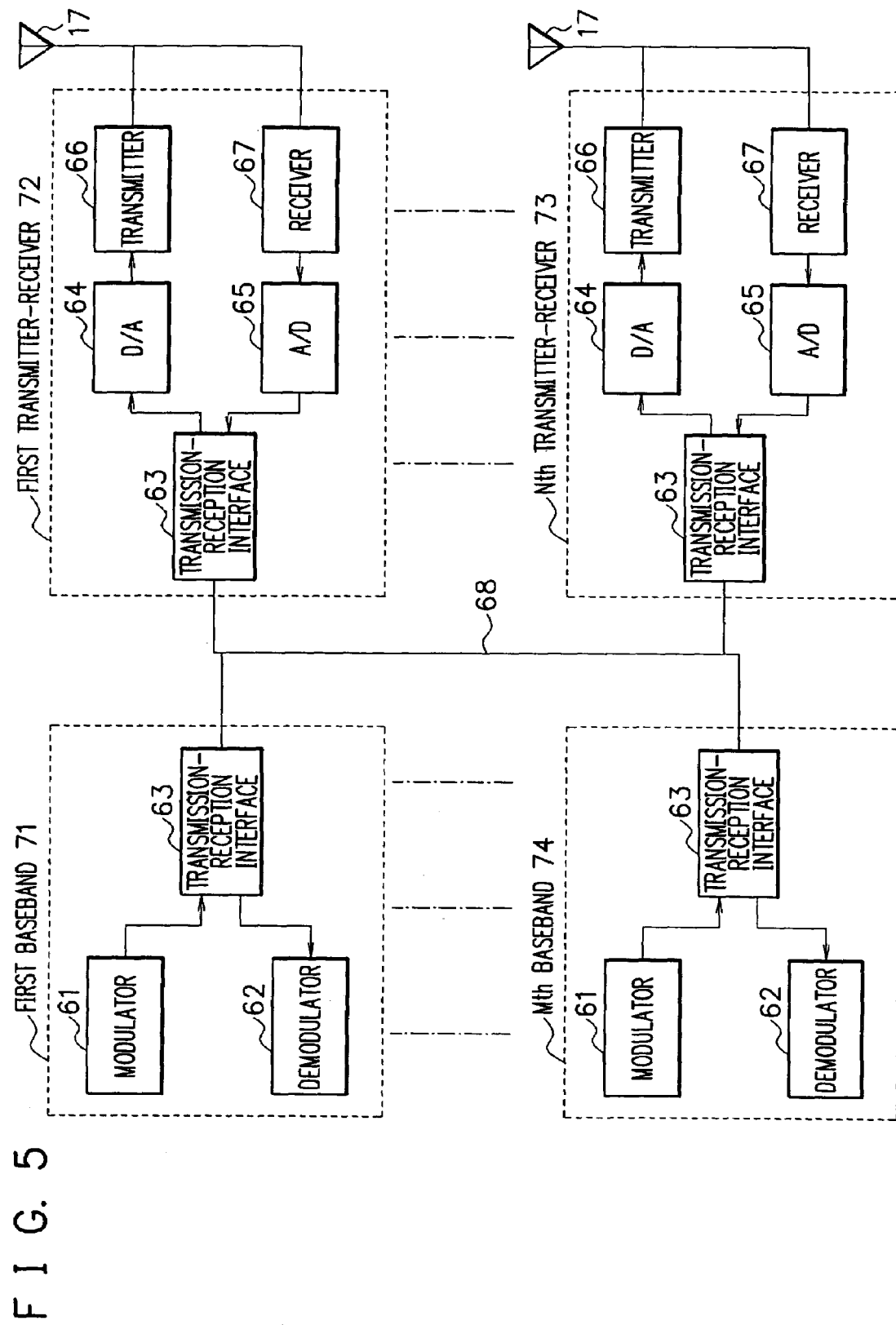
F I G. 5

CELLULAR RADIO COMMUNICATION SYSTEM CELLULAR RADIO COMMUNICATION METHOD AND RAKE RECEPTION METHOD

BACKGROUND OF THE INVENTION

The present invention relates to a cellular radio communication system in which a baseband and a transmitter-receiver are connected via a transmission line, a cellular radio communication method and a rake reception method.

DESCRIPTION OF THE PRIOR ART

The area where the mobile communications are available is divided into blocks called "cellular" based on the distance that a radio wave can travel from an antenna. FIG. 1 is a diagram showing three cells in the structure of a conventional cellular radio communication system. In FIG. 1, in the case of communicating with a mobile terminal 91 in a cell 31, a data signal from a switching exchange 25 is converted to a radio signal by a radio base station 21 and sent to the mobile terminal 91 in the cell 31. On the other hand, a radio signal from the mobile terminal 91 is received by the radio base station 21 and converted to a data signal to be sent to the switching exchange 25.

FIG. 2 shows the structure of a conventional radio base station. A data signal input to a modulator 41 is modulated according to a modulation method such as PSK (Phase Shift Keying), QAM (Quadrature Amplitude Modulation), CDMA (Code Division Multiple Access) and OFDM (Orthogonal Frequency Division Multiplexing), and amplified by a transmitter 43. Then a radio signal is output from an antenna 17 and reaches to a mobile terminal. A radio signal sent from the mobile terminal is received by the antenna 17, amplified by a receiver 44 and demodulated to a data signal by a demodulator 42.

FIG. 3 shows the structure of another conventional radio base station. The radio base station comprises a baseband 58 including a modulator 51 and a demodulator 54, and a transmitter-receiver 59 including a transmitter 55 and a receiver 56. The baseband 58 and the transmitter-receiver 59 are connected via a transmission line 57. When the transmission line 57 is an optical cable, an optical signal is transmitted therethrough. When the transmission line 57 is a metallic cable, an electric signal is transmitted therethrough. The electric power for transmission and reception can be effectively used by placing the transmitter-receiver 59 near an antenna to decrease the electric power loss between the transmitter-receiver 59 and the antenna 17.

The Japanese Patent No. 2858514 discloses a typical example of a conventional radio communication system as described above, which realizes the miniaturization of a master station while suppressing the degradation of transmission quality.

However, a cellular radio communication system which includes the prior radio base station of the above structure has some problems as follows.

First, effective use is not made of the baseband because, in the structure of the radio base station, the baseband and the transmitter-receiver are provided so as to correspond one-to-one with each other.

Second, the structure of the radio base station has a small degree of freedom.

Third, in a cellular radio communication system using CDMA, RAKE reception is performed by using only multipath components of radio signals received from one antenna of the base station, which limits improvement in the effectiveness of rake reception.

SUMMARY OF THE INVENTION

It is an object of the present invention, in order to overcome the above mentioned problems, to provide a cellular radio communication system, a cellular radio communication method, and a rake reception method for improving the usability of a baseband, the freedom of the structure of a radio base station, and the effectiveness of rake reception.

To achieve the object mentioned above, in the first mode of the present invention, a cellular radio communication system comprises one baseband and first to Nth transmitter-receivers connected with each other via a transmission line. The baseband comprises a modulator for producing modulation signals to be transmitted from the first to Nth transmitter-receivers by a digital process and a demodulator for demodulating digital modulation signals, which have been received by the first to Nth transmitter-receivers and undergone analog-to-digital conversion, by a digital process. The transmitter-receiver comprises a digital-to-analog converter for converting a digital modulation signal to a modulation signal to be transmitted and an analog-to-digital converter for converting a received modulation signal to a digital modulation signal.

In the second mode of the present invention, a cellular radio communication system comprises first to Mth basebands and first to Nth transmitter-receivers connected with each other via a transmission line. Each of the basebands comprises a modulator for producing a modulation signal to be transmitted by a plurality of transmitter-receivers associated with the baseband by a digital process and a demodulator for demodulating digital modulation signals, which have been received by the plurality of transmitter-receivers associated with the baseband and undergone analog-to-digital conversion, by a digital process. The transmitter-receiver comprises a digital-to-analog converter for converting a digital modulation signal to a modulation signal to transmit and an analog-to-digital converter for converting a received modulation signal to a digital modulation signal.

The transmitter-receivers associated with each of the basebands may be changed.

In the third mode of the present invention, a cellular radio communication method applied to a cellular radio communication system comprising one baseband and first to Nth transmitter-receivers connected with each other via a transmission line, comprising the steps of: producing, at the baseband, a modulation signal to be sent by each of the first to Nth transmitter-receivers by a digital process; converting, at the transmitter-receiver, a digital modulation signal to a modulation signal to be sent and outputting the signal from an antenna; converting, at the transmitter-receiver, a modulation signal received by the antenna to a digital modulation signal; and demodulating, at the baseband, a digital modulation signal, which has been received and undergone analog-to-digital conversion at each of the first to Nth transmitter-receivers, by a digital process.

In the fourth mode of the present invention, a cellular radio communication method applied to a cellular radio communication system comprising first to Mth basebands and first to Nth transmitter-receivers connected with each other via a transmission line, comprising the steps of: modulating, at the baseband, signals to produce modulation signals to be sent by a plurality of transmitter-receivers associated with the baseband by a digital process; converting, at the transmitter-receiver, a digital modulation signal to a modulation signal to be sent and outputting the signal from an antenna; converting, at the transmitter-receiver, a modulation signal received by the antenna to a digital modulation signal; and demodulating, at the baseband, digital modulation signals, which have been received and undergone analog-to-digital conversion at the plurality of transmitter-receivers associated with the baseband, by a digital process.

In the step of modulating or demodulating, the transmitter-receivers associated with each of the basebands may be changed.

Multiple multipath components may be produced from CDMA signals received by the transmitter-receivers in multiple cells to select and synthesize high-level components.

BRIEF DESCRIPTION OF THE DRAWINGS

The above and further objects and novel features of the invention will be more fully understood from the following detailed description when the same is read in connection with the accompanying drawings in which:

FIG. 4 is a block diagram showing the structure of a base station according to the first embodiment of the present invention;

FIG. 5 is a block diagram showing the structure of a base station according to the second embodiment of the present invention;

DETAILED DESCRIPTION OF THE PREFERRED EMBODIMENTS

Figure 1:
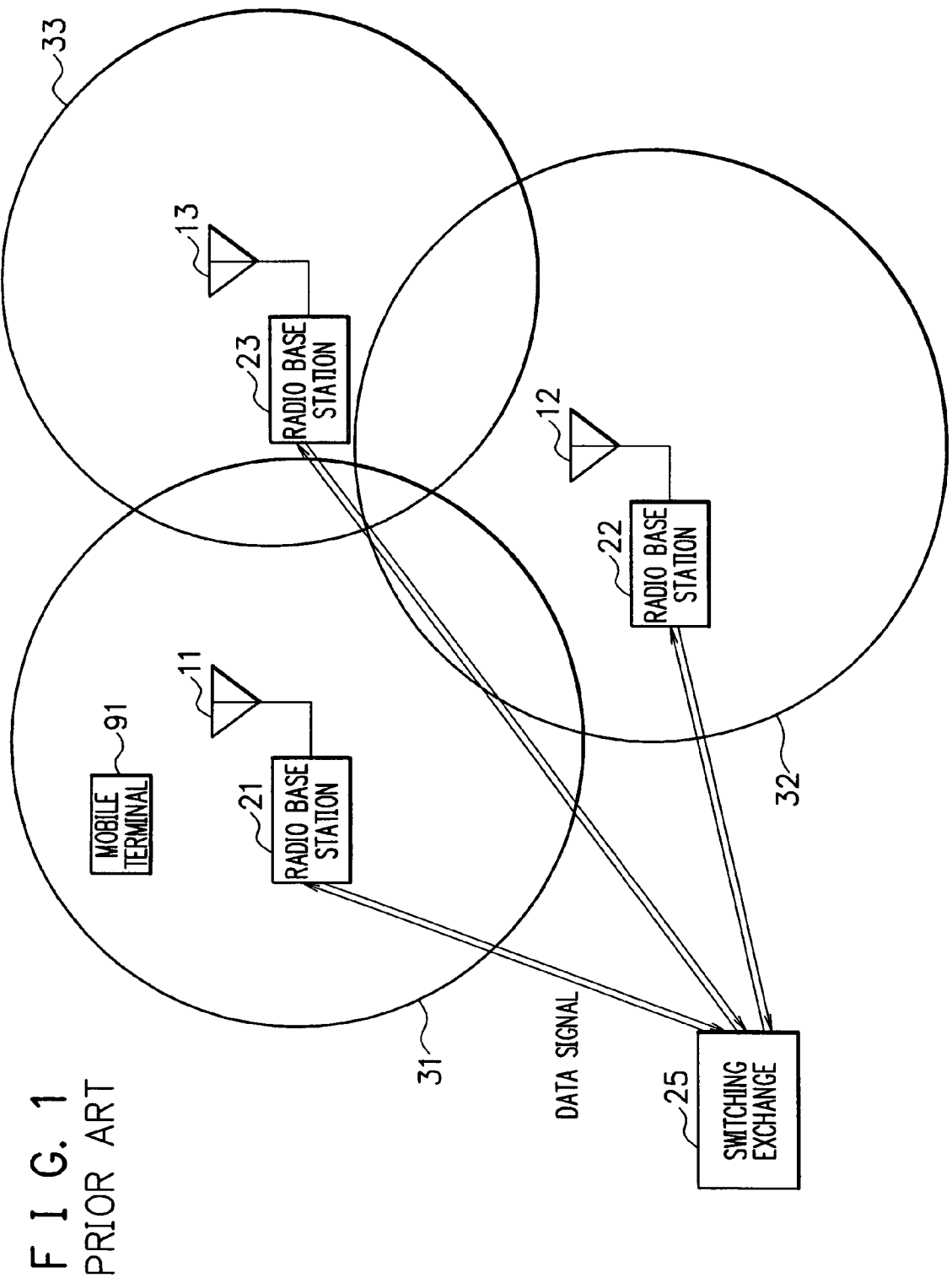
FIG. 1 is a diagram showing the structure of a conventional cellular radio communication system.
Figure 2:
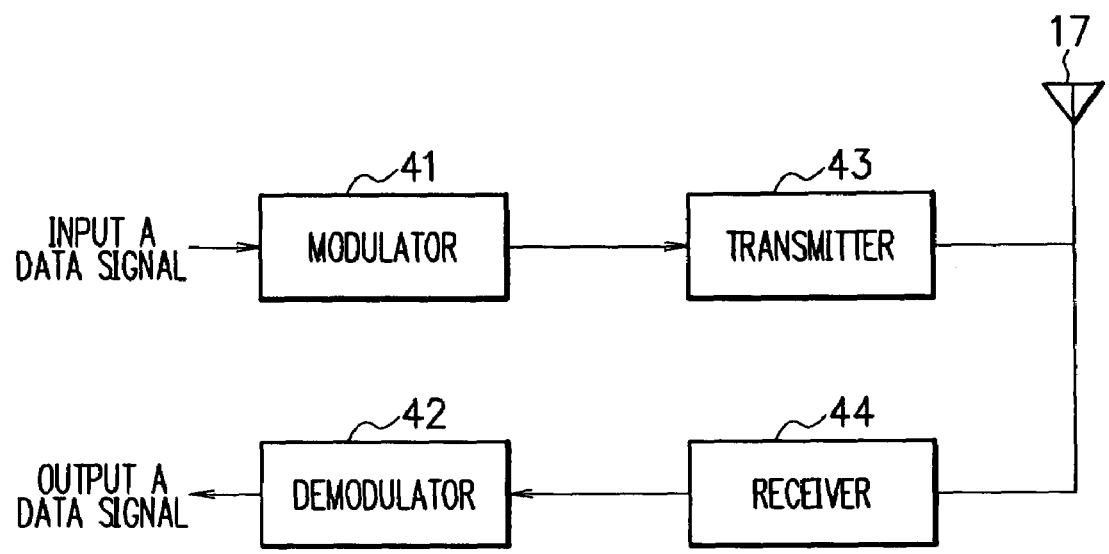
FIG. 2 is a diagram showing the structure of a conventional radio base station.
Figure 3:
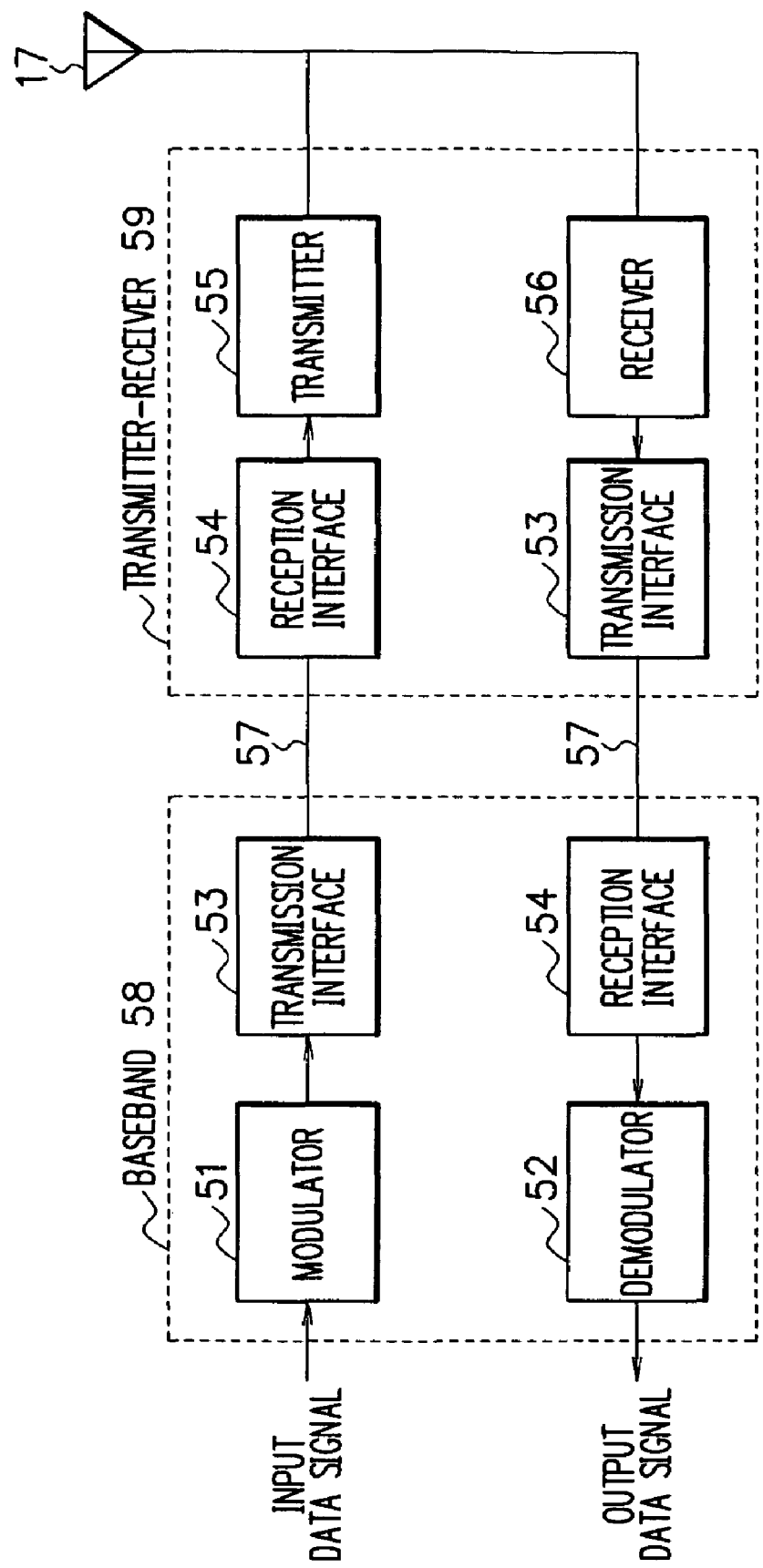
FIG. 3 is a diagram showing the structure of another conventional radio base station.

FIG. 4 is a block diagram showing the structure of a base station according to the first embodiment of the present invention. Referring to FIG. 4, each of N pieces of base stations is comprised of a baseband 71 and first to Nth transmitter-receivers connected via a transmission line 68. The baseband 71 comprises a modulator 61, a demodulator 62 and a transmission-reception interface 63.

Each transmitter-receivers is comprised of a digital-to-analog converter 64, an analog-to-digital converter 65, a transmitter 66, a receiver 67 and a transmission-reception interface 63. One baseband carries out baseband operations for the first to Nth transmitter-receivers.

The baseband 71 performs digital processing including CPU software processing by using a digital signal. That is, the baseband 71 performs time-sharing processing or parallel processing by one or more digital processing circuits.

The modulator 61 performs modulation by a modulation method such as PSK (Phase-Shift Keying), QAM (Quadrature Amplitude Modulation), CDMA (Code Division Multiple Access), OFDM (Orthogonal Frequency Division Multiplexing) or multiplex modulation by a plurality of modulation methods. The modulator 61 produces modulation signals to be sent by the first to Nth transmitter-receivers by the time-sharing processing or the parallel processing.

The demodulator 62 performs demodulation by a demodulation method such as PSK, QAM, CDMA, OFDM or multiplex demodulation by a plurality of demodulation methods. The demodulator 62 demodulates modulation signals received from the first to Nth transmitter-receivers by the time-sharing processing or the parallel processing.

The baseband 71 and the first to Nth transmitter-receivers are connected by the transmission line 68 and transmit and receive digital signals through the transmission-reception interfaces 63. Examples of the transmission line(s) include N pieces of transmission lines connecting the baseband 71 and the first to Nth transmitter-receivers, one virtual transmission line time-shared by the baseband 71 and the first to Nth transmitter-receivers for digital signal transmission such as the Internet using TCP/IP protocol, or an optical transmission line in which digital signals to/from the baseband 71 and the first to Nth transmitter-receivers are time-division multiplexed or wavelength multiplexed.

Referring to FIG. 4, a description will be given of the operation of the base station according to the first embodiment. An input data signal is modulated at the modulation processor 61 of the baseband 71. The modulator 61 produces a modulation signal to be sent to the first to Nth transmitter-receivers through the time-sharing processing or the parallel processing. A modulated digital signal is transmitted to the transmission-reception interface 63 in the baseband 71. The transmission-reception interface 63 transmits the digital signal to the transmission-reception interface 63 of the respective first to Nth transmitter-receivers via the transmission line 68.

The transmission-reception interface 63 of each first to Nth transmitter-receiver transmits the received digital signal to the digital-to-analog converter 64. The digital-to-analog converter 64 outputs a modulated analog signal. When the frequency of the modulated analog signal is the same as that of a frequency band used for radio communication, the modulated signal is amplified by the transmitter 66 and output from an antenna 17. When the frequency of the modulated signal is lower than that of a frequency band used for radio communication, the signal is converted to the frequency of the frequency band, amplified by the transmitter 66 and output from the antenna 17.

A radio signal received from the antenna 17 of each first to Nth transmitter-receiver is amplified by the receiver 67, and then converted to a digital signal at the analog-to-digital converter 65. Incidentally, to moderate the processing speed at the baseband 71, the radio signal may be converted to a digital signal at the analog-to-digital converter 65 after changing the frequency of the radio signal to a lower frequency. The digital signal is sent from the transmission-reception interface 63 in the transmitter-receiver to the transmission-reception interface 63 in the baseband 71 via the transmission line 68, then sent to the demodulator 62. At the demodulator 62, the digital signal sent from each of the first to Nth transmitter-receivers is demodulated by the time-sharing processing or the parallel processing to output a data signal.

FIG. 5 is a block diagram showing a base station according to the second embodiment of the present invention. In FIG. 5, first to Mth basebands and first to Nth transmitter-receivers are connected through transmission-reception interfaces 63 by a transmission line 68. Examples of the transmission line 68 include a transmission line time-shared by the first to Mth basebands and the first to Nth transmitter-receivers for digital signal transmission such as the Internet using TCP/IP protocol, and an optical transmission line in which digital signals to/from the first to Mth basebands and the first to Nth transmitter-receivers are time-division multiplexed or wavelength multiplexed.

Referring to FIG. 5, a description will be given of the operation of the base station according to the second embodiment. The basebands and the transmitter-receivers are connected via the transmission line 68. Each baseband takes charge of a modulation-demodulation processing for the plural transmitter-receivers as in the first embodiment. For example, the first baseband 71 is in charge of the first transmitter-receiver 72 and the third transmitter-receiver, while the Mth baseband 74 is in charge of the second transmitter-receiver, the fourth transmitter-receiver and the Nth transmitter-receiver 73. The association between each baseband and transmitter-receivers changes dynamically. Depending on the number of mobile terminals in a cell and the use condition of the cell, a load of modulation-demodulation processing on the baseband which controls a plurality of cells changes. When a load of processing on a particular baseband increases and the baseband is overloaded, a part of the load is transferred to another baseband which has a small load. In case of a failure in the baseband, its load is transferred to another baseband or to other basebands.

Figure 6:
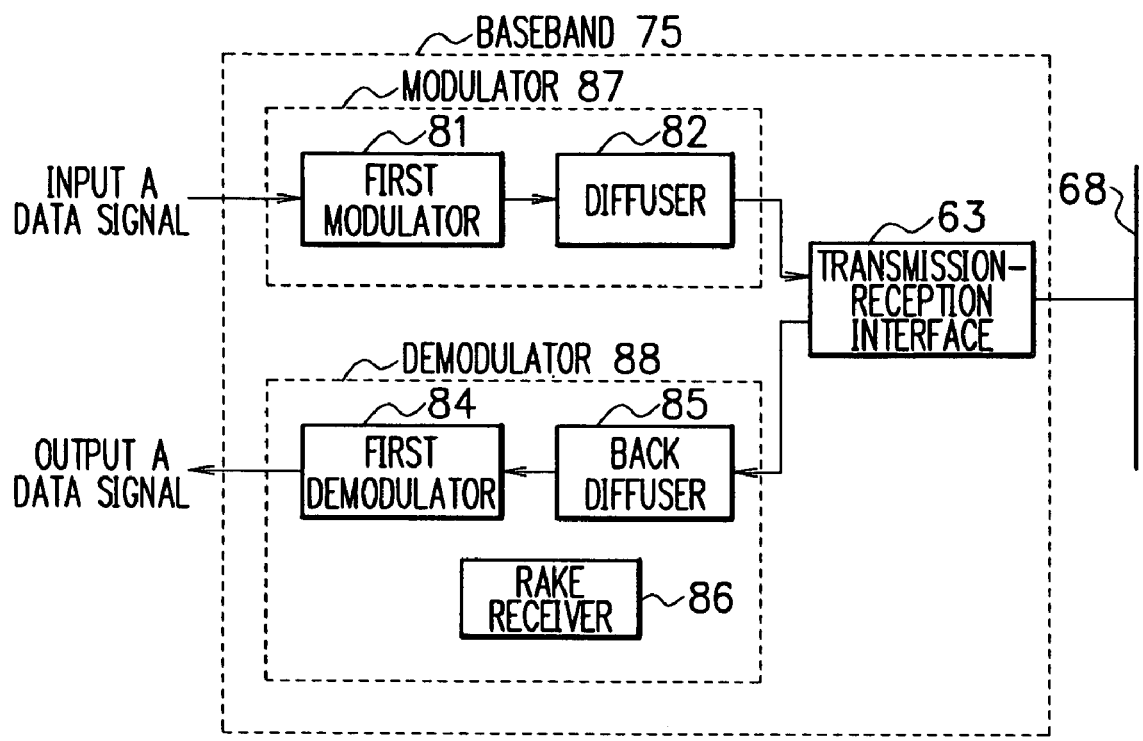
FIG. 6 is a block diagram showing the structure of a baseband in the case of communication using CDMA according to the third embodiment of the present invention.

FIG. 6 is a block diagram showing the detailed structure of a baseband using CDMA radio signals according to the third embodiment of the present invention. A modulator 87 comprises the first modulator 81 which performs modulation such as PSK, QAM, and OFDM, and a diffuser 82. A demodulator 88 comprises a back diffuser 85, a first demodulator 84 which performs demodulation and a rake receiver 86.

Referring to FIG. 6, a description will be made of the operation of the baseband 75 using CDMA radio signals. The modulator 87 performs modulation such as PSK, QAM, and OFDM at the first modulator 81, and then performs diffusion at the diffuser 82 to produce a CDMA signal. The CDMA signal is sent to a transmitter-receiver by the transmission-reception interface 63 via the transmission line 68.

On the other hand, the CDMA signal received by the transmitter-receiver is sent to the demodulator 88 by the transmission-reception interface 63 of the baseband 75 via the transmission line 68. The demodulator 88 performs back diffusion at the back diffuser 85, and then performs demodulation such as PSK, QAM, and OFDM at the first demodulator 84.

The rake receiver 86 performs rake reception of CDMA signals not only from a transmitter-receiver in one cell but also from transmitter-receivers in a plurality of cells. As in the case where a mobile terminal is moving between cells, when a mobile terminal is in the coverage area of a plurality of cells, the rake receiver 86 performs rake reception of CDMA signals from the transmitter-receivers in the plurality of cells. For that reason, as shown in FIG. 7, one baseband is in charge of a plural adjacent cells to enlarge the cell area for which the baseband can perform rake reception.

Figure 7:
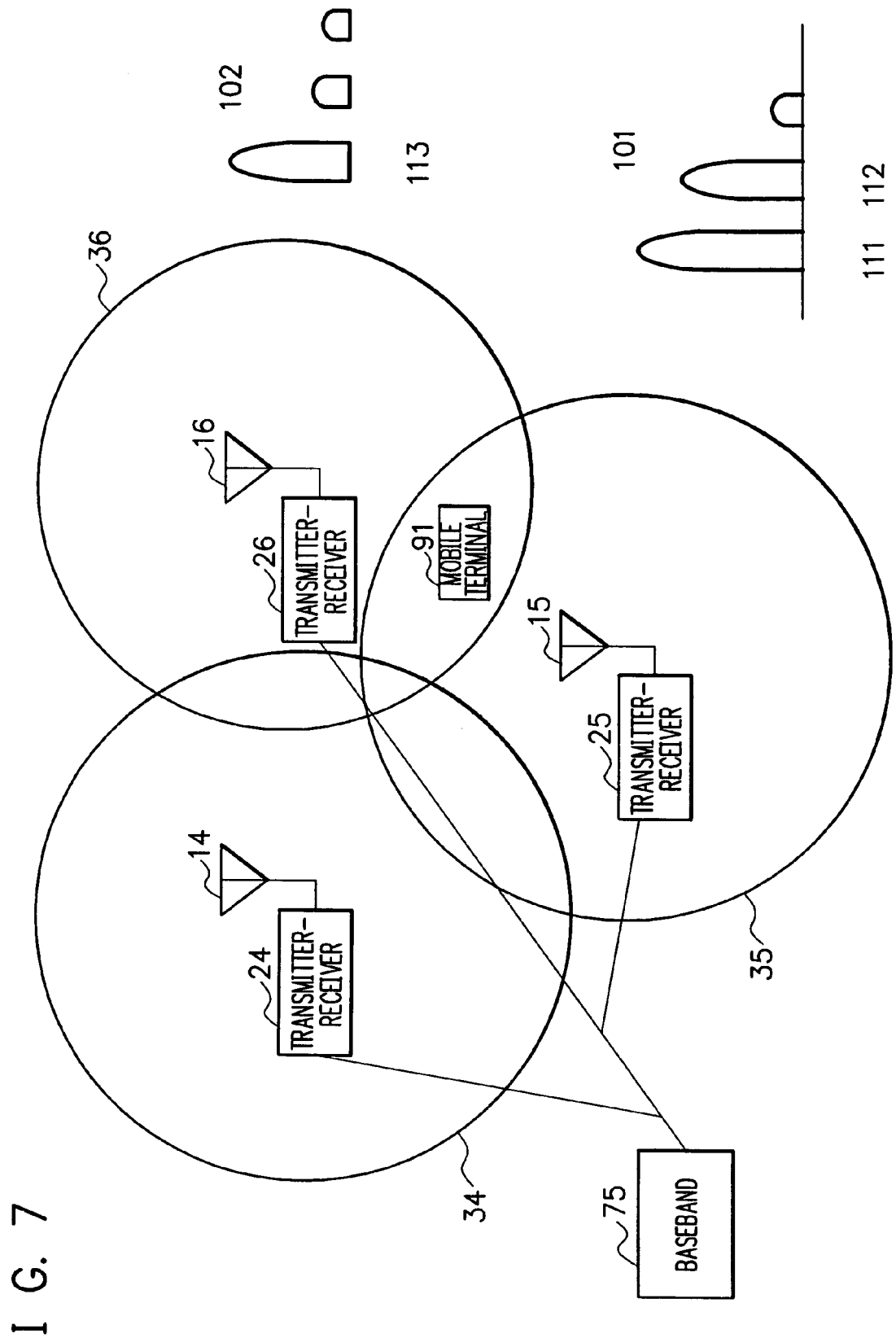
FIG. 7 is a diagram showing the structure of a rake reception system in which rake reception is performed using a received signal from transmitter-receivers in a plurality of cells of the third embodiment.

In FIG. 7, when a mobile terminal 91 is within two cells 35 and 36, a transmitter-receiver 25 and a transmitter-receiver 26 digital-analog converts CDMA signals received from the mobile terminal 91, and then transmits the signals to the baseband 75. The rake receiver 86 in the baseband 75 extracts multipath components 101 and 102 of the same data from each CDMA signal. From the multipath components 101 and 102, the high-level components (111, 112, 113) are extracted and synthesized. The synthesized signal is demodulated in the first demodulator 84, and a data signal is output.

As set forth hereinabove, in accordance with the present invention, a plurality of radio base stations each comprise one baseband and a plurality of transmitter-receivers. Thus, the number of the baseband can be reduced.

Moreover, a plurality of basebands and a plurality of transmitter-receivers are connected with each other via one or more transmission lines. Thereby, the association between each baseband and the transmitter-receivers can be changed freely according to the situation.

Further, high-level multipath components received from a plurality of antennas are extracted and synthesized for rake reception, which can be performed without using handover even when a mobile terminal is moving between cells.

While preferred embodiments of the invention have been described using specific terms, the description has been for illustrative purpose only, and it is to be understood that changes and variations may be made without departing from the spirit or scope of the following claims.

What is claimed is:

1. A cellular radio communication system comprising a baseband and first to Nth transmitter-receivers connected by a transmission line, wherein
   the baseband comprises:
   a modulator for producing modulation signals to be transmitted from the first to Nth transmitter-receivers by a digital process; and
   a demodulator for demodulating digital modulation signals, which have been received by the first to Nth transmitter-receivers and undergone analog-to-digital conversion, by a digital process; and
   each of the first to Nth transmitter-receivers comprises:
   a digital-to-analog converter for converting a digital modulation signal to a modulation signal to be transmitted; and
   an analog-to-digital converter for converting a received modulation signal to a digital modulation signal,
   wherein at least one of the first to Nth transmitter-receivers and the baseband performs time-sharing processing or parallel processing on signals provided thereto,
   wherein the baseband further comprises:
   a RAKE receiver configured to receive signal data provided by at least two of the first to Nth transmitter-receivers respectively assigned to at least two cells of the cellular radio communication system, and to perform RAKE processing of the signal data.

2. The cellular radio communication system claimed in claim 1, wherein the cellular radio communication system comprises first to Nth cells respectively assigned to the first to Nth transmitter-receivers, and
   wherein the RAKE receiver of the baseband is configured to perform RAKE processing for more than one cell of the first to Nth cells.

3. The cellular radio communication system claimed in claim 2, wherein the RAKE receiver extracts multipath components of a same signal received from each of the least two of the first to Nth transmitter-receivers, in a case in which a mobile terminal is located in a region overlapped by at least two cells of the first to Nth cells.

4. A cellular radio communication system comprising first to Mth basebands and first to Nth transmitter-receivers connected via a transmission line, wherein
   each of the first to Mth basebands comprises:
   a modulator for producing a modulation signal to be sent by a plurality of transmitter-receivers associated with the baseband by a digital process; and a demodulator for demodulating digital modulation signals, which have been received by the plurality of transmitter-receivers associated with the baseband and undergone analog-to-digital conversion, by a digital process; and each of the first to Nth transmitter-receivers comprises:

a digital-to-analog converter for converting a digital modulation signal to a modulation signal to transmit; and an analog-to-digital converter for converting a received modulation signal to a digital modulation signal, wherein the each of the first to Mth basebands further comprises:

a RAKE receiver configured to receive signal data provided by at least two of the first to Nth transmitter-receivers respectively assigned to at least two cells of the cellular radio communication system, and to perform RAKE processing of the signal data, wherein M is less than N.

5. The cellular radio communication system claimed in claim 4, wherein the cellular radio communication system comprises first to Nth cells respectively assigned to the first to Nth transmitter-receivers, and wherein the RAKE receiver of the respective first to Mth basebands is configured to perform RAKE processing for more than one cell of the first to Nth cells.

6. The cellular radio communication system claimed in claim 5, wherein the RAKE receiver extracts multipath components of a same signal received from each of the least two of the first to Nth transmitter-receivers, in a case in which a mobile terminal is located in a region overlapped by at least two cells of the first to Nth cells.

* * * * *